(12) United States Patent
Maney

(10) Patent No.: US 6,370,659 B1
(45) Date of Patent: Apr. 9, 2002

(54) METHOD FOR AUTOMATICALLY ISOLATING HARDWARE MODULE FAULTS

(75) Inventor: John J. Maney, Malabar, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/296,347

(22) Filed: Apr. 22, 1999

(51) Int. Cl.$^7$ ................................................. H02H 3/05
(52) U.S. Cl. ........................................ 714/25; 714/715
(58) Field of Search ............................ 714/25, 26, 27, 714/47, 715, 735, 736, 737, 738; 370/241, 253

(56) References Cited

U.S. PATENT DOCUMENTS

| | | | |
|---|---|---|---|
| 3,714,403 A | 1/1973 | Ammann et al. ............ 235/153 |
| 3,787,670 A | 1/1974 | Nelson et al. ............... 235/153 |
| 3,813,647 A | 5/1974 | Loo ......................... 340/172.5 |
| 4,142,243 A | 2/1979 | Bishop et al. ............... 364/900 |
| 4,228,535 A | * 10/1980 | Workman et al. ............. 370/16 |
| 4,371,952 A | 2/1983 | Schuck ........................ 364/900 |
| 4,435,759 A | 3/1984 | Baum et al. ................. 364/200 |
| 4,573,152 A | 2/1986 | Greene et al. ................. 371/22 |
| 4,712,213 A | 12/1987 | Warwick et al. ............... 371/15 |
| 4,802,164 A | 1/1989 | Fukuoka et al. ............... 371/16 |
| 5,086,302 A | 2/1992 | Miller ........................ 342/373 |
| 5,146,460 A | * 9/1992 | Ackerman et al. ............. 714/25 |
| 5,157,668 A | 10/1992 | Buenzli, Jr. et al. ........ 371/15.1 |
| 5,361,347 A | 11/1994 | Glider et al. ................ 395/575 |
| 5,410,686 A | * 4/1995 | Kish ............................ 714/30 |
| 5,581,694 A | 12/1996 | Iverson et al. ............ 395/183.02 |
| 5,592,615 A | 1/1997 | Mishima ................... 395/183.2 |
| 5,652,754 A | 7/1997 | Pizzica ....................... 371/22.4 |
| 5,680,537 A | * 10/1997 | Byers et al. ................... 714/5 |
| 5,909,541 A | * 6/1999 | Sampson et al. ............... 714/6 |

* cited by examiner

*Primary Examiner*—Dieu-Minh Le
(74) *Attorney, Agent, or Firm*—Allen, Dyer, Doppelt, Milbrath & Gilchrist, P.A.

(57) ABSTRACT

A method of automatically isolating item faults is disclosed. Subtest results T[i] are obtained for a plurality of items, where T[ ] comprises a vector of m subtest results and T[i]=a value if subtest i fails and subtest i does not fail, T[i]=a negative value or 0. The subtest results T[i] are multiplied or ANDed with respective matrix values Y[i,j], where Y[ ] comprises a predetermined m×n matrix where Y[i,j]>0 if hardware module j causes subtest i to fail and Y[i,j]≦0 if item j does not cause subtest i to fail. The results are summed in order to obtain a number S[j] for each item that is reflective of the number of subtest failures that are explained by a failure of item j, wherein any item j is suspect if S[j]>0. The item that has the most likely failure is determined by obtaining the largest value of S[j] when S[j] has multiple non-zero entries, such that the largest value of S[j] is indicative of the most likely single item failure where any other items with non-zero S[j] represent alternate possible item failures.

34 Claims, 11 Drawing Sheets

METHOD FOR AUTOMATICALLY ISOLATING HARDWARE MODULE FAULTS

FIELD OF THE INVENTION

This invention is related to a method for automatically isolating item faults in a system, and more particularly, this invention is related to a method for automatically isolating item faults by using matrices to identify which have failed.

BACKGROUND OF THE INVENTION

Fault isolation techniques and related methods of automatically detecting faults (such as for line replaceable units or least replaceable units (LRU)) are becoming increasingly important to maintain complicated apparatus and communications equipment in proper operating order. One of the drawbacks of conventional fault isolation techniques is the use of software that is specific to a general system, such as a communication system. For example, in the prior art fault isolation technique labeled FIG. 1, four line replaceable units are illustrated at 200a–d as part of the equipment forming a general communication system indicated by the dotted line at 22. The line replaceable units 200a–d output to respective line replaceable units as illustrated. The prior art communications equipment includes a sensor 24 that would sense respective a line replaceable unit 20d and means to conduct a subtest and generate performance data to an automatic fault isolation software or hardware module 26, which would not be part of the communication equipment. A software module would include the appropriate processor having specific software with numerous software branches that depend on hardware and system specific algorithms.

The sensor 24 typically checks the status of equipment and outputs performance data. Often, a line replaceable unit 20 may generate its own status bit, such as an "on" or "off" bit, which indicates a problem has occurred in a line replaceable unit. Any automatic fault isolation software typically is a complicated software code with many branches. It is costly to develop, test and maintain. Additionally, this complicated software is difficult to reuse because the specific case branches depend on the specific hardware, which naturally is different in each system. In the prior art process, the automatic fault isolation software or hardware module 26 identifies the failed line replaceable unit, and then outputs a status report to an operator.

FIG. 2 illustrates a basic problem showing why automatic fault isolation techniques are difficult. Individual line replaceable units are shown as hardware modules, and given reference numerals 30A–30H. For example, both hardware modules 30A and 30B are required to provide necessary signal inputs to the other modules 30C, 30D and 30E, which in turn are directly responsible for providing input signals to respective hardware modules 30F, 30G and 30H. Thus, a failure of either module 30A or module 30B can cause the observed test failures. FIG. 3 shows a diagram similar to FIG. 2, but having module 30E input signals to modules 30H and 30I. It is evident that one hardware module failure can make several subtests fail, and different hardware module failures can cause similar patterns of subtest failures.

Many prior art devices and software systems have been developed to aid in diagnostic testing of different hardware, using status checks and software testing. Examples include the following systems and apparatus disclosed in the following U.S. Patents.

U.S. Pat. No. 5,652,754 to Pizzica discloses a signature analysis usage limited to 100% digital systems for fault isolation. It derives a digital signature by a sequence of binary operations on the digital outputs of the module, in response to a sequence of digital inputs to the module. It does not consider any other electrical or physical variables. It is disclosed for single electrical node short or open failures, and other node failure types without substantiation, but does not disclose multiple node failures or failures internal to components. This system typically cannot be applied during normal system operation, and relies on an external test input signal source for a predetermined sequence of input stages. It requires disconnection of module inputs from their operational configuration, and connection instead to the external test input signal source. It looks for exact matches to predetermined signatures derived from digital module outputs, rather than partial matches to lists of symptoms caused by component failures. It makes no attempt to find an explanation for the greatest number of observed symptoms.

U.S. Pat. No. 3,813,647 to Loo discloses a system that does a window comparison on a sequence of analog or pulse rate test points, with branches in the sequence depending on any values out of tolerance. It looks first at high level summary indications, and then in more detail at a subset of equipment where a high level fault was found. It also includes signal generators to provide synchronized stimuli to the system under test during the sequence. It seems to flag only a single fault, the first that it arrives at in the preprogrammed sequence. This method requires stimulating the system under test with predetermined inputs from signal generators or equivalent.

U.S. Pat. No. 3,787,670 to Nelson discloses a system that considers various physical variables such as punched card movement, voltage, temperature, pressure, etc. to be converted to digital signals using an A/D converter. A major feature is the use of photo cells for sensing punched cards. Performance of various subunits would be measured and monitored relative to correct performance. The system compares quantized digital values to reference values, but without specifying high and low limits, and a central processor is used for the comparisons and decisions. The system identifies the location in the equipment where the bad data value occurred.

U.S. Pat. No. 4,142,243 to Bishop et al. discloses a system for fault detection using checksums on a digital computer. The system checks for faults first in large sets, then checks in subsets contained in the large set where a fault occurred. The system assumes a simple one to one correspondence of checksum memory locations and hardware fault locations, and a computer under test to follow a predetermined sequence of digital states so that measured and pre-stored checksums match. The technique does not apply during normal online operation.

U.S. Pat. No. 5,157,668 to Buenzli, Jr. et al. discloses a fault isolation system that uses reasoning techniques, minimal test patterns, component modeling, and search strategies. Modeling uses "behavioral constraints" which include "phase constraints," gain constraints, compliances, tolerances, and saturation. "Phase constraints" equals IF inputs change, and outputs change in the plus/minus direction. The system uses recursive top-down hierarchical search strategy starting with highest level modules, and isolates low-level circuit components. The system also uses a library of circuit component models, and starts with normal functional tests, requiring detailed functional test plan. It also assumes that an operator already knows which module is tested by each functional test. The system also assumes electric schematic, CAD models, CAE models, and layout diagrams are available, and typically it would be difficult to apply during normal system operation. The system relies on an external test input signal source for a predetermined sequence of input states, and disconnects module inputs from their operational configuration, and connects instead to the external test input signal source.

U.S. Pat. No. 5,581,694 to Iverson discloses a fault isolation system that receives data samples, indicating the operating status of units in a system, and analyzes this data to identify unit failures, using a knowledge base (in a data structure) about the equipment. The knowledge base describes signal flow through the system, and the technique considers failure propagation along this signal flow.

SUMMARY OF THE INVENTION

It is therefore an object of the present invention to provide a method for automatically isolating item faults that can use standard fault detection status inputs and subtests and work both "on" and "off" line for either start-up or operational automatic fault isolation.

It is still another object of the present invention to provide a method for automatically isolating item faults that can identify all potentially failed items and use a software that does not have many program branches.

In accordance with the present invention, the present invention is advantageous because it provides a method and software implementation for automatic fault isolation that uses data matrices that can identify which item failures cause which status input and subtest failures. The present invention also identifies specific subtest successes to prove that specific items are operative, and identifies in ranked order any items whose failure can explain the greatest number of subtest failures. The present invention breaks ties using expected failure rate data or other criteria for which suspect item should be replaced first, such as ease of replacement, availability of spare modules and other details.

The method and software implementation of the present invention is also advantageous because it can identify all potentially failed items, and it can be implemented in a simplified software or circuit. Because the hardware to be fault isolated is different each time, the software of the present invention does not have to be unique to the hardware and rewritten each time. Thus, any software would not have to be lengthy and complicated with special case logic for each item.

The present invention is also advantageous because it separates the system-specific data into a simple tabular data structure, making the resulting actual software code short, generic, maintainable and reusable. The claimed invention can be used to provide automatic fault isolation in cars, airplanes, computers, communication systems, machinery and many other different products known to those skilled in the art. In accordance with the present invention, a method of automatically isolating item faults includes the steps of obtaining subtest results T[i] for a plurality of items where T[] comprises a vector of m subtest results and T[i]>0, if subtest i fails and if subtest i does not fail, T[i]≦0. The method also comprises processing the subtest results T[i] with respective matrix values Y[i,j], where Y[] comprises a predetermined m×n matrix. Y[i,j]>0 if item j causes subtest i to fail, and Y[i,j]≦0 if item j does not cause subtest i to fail. The results are summed in order to obtain a number S[j] for each item that is reflective of the number of subtest failures that are explained by a failure of item j, wherein any item j is suspect if S[j] is>0. S[j] reflects the degree of matching or correlation of the actual failure pattern with the expected failure pattern for item j.

In accordance with the present invention, the method also comprises the step of determining which item has the most likely failure by determining the largest value of S[j] when S[j] has multiple non-zero entries. The largest value of S[j] is indicative of the most likely single item failure, where any other items with non-zero S[j] represent alternate possible item failures. Subtest results T[i] and matrix values Y[i,j] are correlated, compared, vector multiplied and summed, or vector ANDed and summed.

In accordance with still another aspect of the present invention, a probability factor FP[i] is compared when there are two or more numbers S[j] that have substantially the same largest value to determine which item has the most likely failure. The probability factor FP[i] comprises estimated failure rates or the ease of replacement of respective items. A raw number Sraw[j] reflective of all observed subtest failures is initially obtained and processed with variables sumTN[] that rule out certain item failures to obtain S[j].

The method obtains subtest status Trun[] for a plurality of n items where Trun[] comprises a vector of m status values and Trun[i]=1 if the result of subtest i is known, and Trun[i]=0 if the result of subtest i is unknown.

The method first correlates or compares the subtest results T[] with matrix values Y[], where Y[] comprises a predetermined m×n matrix where Y[i,j]>0 if failure of item j can cause subtest i to fail and Y[i,j]≦0 if failure of item j does not cause subtest i to fail.

For each i, the method can set a value Tmod[i]=a positive value if Trun[i]=0, and Tmod[i]=T[i] if Trun[i]=1, where Tmod[] comprises a vector of m subtest results and Tmod[i]=the degree to which subtest i fails or passes, with Tmod[i]>0 for failure and Tmod[i]≦0 for success.

The method can set each value SumN[j]=a positive value if column or row j of matrix N corresponding to item j has any nonzero entries, and SumN[j]=0 if column or row j of matrix N has no nonzero entries, where SumN[j]=a positive value if SumTN can be used to prove that item J is ok, and SumN[j]=0 if SumTN cannot be used to prove that item j is ok.

The method can also correlate or compare second matrix values N[i,j] with the subtest results Tmod[i], where N[] comprises a predetermined m×n matrix where N[i,j]>0 if failure of item j causes subtest i to fail and N[i,j]=0 if failure of item j does not cause subtest i to fail.

The method can obtain from the second correlation of comparison a value SumTN[j] for each item that reflects a weighted number of subtest failures that are explained by a failure of item j, or the degree of similarity of T[] to the minimum failure pattern expected from a failure of item j, wherein any item j is not suspect if SumN[j]>0 and SumTN[j]<a positive threshold.

The method can set each value S[j]=0 if SumN[j]>0 and SumTN[j]<a positive threshold, or otherwise S[j]=Sraw[j], where S[j] for each item j reflects the number of subtest failures that are explained by a failure of item j, or the degree of similarity of T[] to the maximum failure pattern expected from a failure of item j, wherein any item j is suspect if S[j] is >0.

The method can obtain a predetermined probability factor FP[j] for each item j, where FP reflects relative item failure rates, or ease of item repair or replacement, or other criteria for breaking ties in values of S[] and replacing which item first.

The method can determine which item x has the most likely primary failure by determining the largest value of S[j] when S[j] has multiple nonzero entries, and breaking ties based on the largest value of FP[], such that the largest value of S[j], or S[j] and FP[j] for ties, is indicative of the most likely single primary item failure where any other items with S[j] above a threshold represent alternate possible secondary item failures.

The method can obtain from Y[] the column or row Yx[] corresponding to item x, and set T[i]=0 for all i where Yx[i]>0, and repeat all steps up to this point until all entries of T[]=0, where more than one item may be identified as a primary failure.

The system analyst can predict by analysis and verify by experiment which item failures may cause which subtests to fail. Let m be the number of subtests and n be the number of items. Let Y[] be a predetermined m×n matrix where Y[i,j]>0 if item j can cause subtest i to fail, and Y[i,j]≦0 otherwise. For purposes of description, the first value will be described throughout as a 1. The second value will be described as a 0. Let T[] be a vector of m subtest results where T[i]>0 if subtest i fails, and ≦0 otherwise. Then if subtest i fails, any item j for which Y[i,j]=1 is suspect. In general, $$S[j] = \sum_{i=1}^{m} Y[i,j] * T[i]$$

equals the number of observed subtest failures that are explained by a failure of item j. Any item j is suspect if S[j]>0.

Majority Voting

By using fractional values in N and comparing the result to a non-zero threshold, a single matrix N can provide: (1) single subtests that can each prove an item is okay; (2) groups of subtests that together can prove an item is okay; and (3) a majority vote of subtests that can prove an item is okay or suspect.

To handle cases where items can be proved acceptable if a combination of subtests all passes, let N[] be a predetermined m×n matrix where N[i,j]=1 if subtest i is part of a set of subtests that together can prove j is acceptable, and 0 otherwise. Then $$\text{Sum } N[j] = \sum_{i=1}^{m} N[I,j] > 0$$

if some set of subtests can prove item j is acceptable, and if $$\text{Sum} TN[j] = \sum_{i=1}^{m} N[i,j] * T[i] < 1,$$

then all subtests in this set pass and item j is acceptable. If item j is acceptable, the system sets S[j]=0. If $$\text{Sum} TN[j] = \sum_{i=1}^{m} N[i,j] * T[i] \geq 1,$$

then at least one subtest in the set failed so the item is suspect.

To handle cases where items can be proved acceptable if any one of a set of P subtests passes, let N[i,j]=1/P if subtest i alone can prove item j is okay, and 0 otherwise. Then if $$\text{Sum} TN[j] = \sum_{i=1}^{m} N[i,j] * T[i] < 1,$$

at least one subtest in this set passed and module j is acceptable. If module j is acceptable, the system sets S[j]=0. If $$\text{Sum} TN[j] = \sum_{i=1}^{m} N[i,j] * T[i] = P/P = 1,$$

then all of the P subtests in the set failed so the module is suspect.

A fractional value of N[i,j] also provides the majority voting capability. This is useful where multiple devices connect to and depend on the same signal, such as a power supply or serial port. If a majority of the devices are working, the power supply or serial port must be acceptable. But if a majority of the devices show power-related or communication faults, the power supply or serial port is suspect. The threshold can also be set to an application-dependent value rather than a simple majority. In either case, let N[i,j]=1/P if fewer than P subtest failures prove that module j is acceptable, and 0 otherwise. Then if $$\text{Sum} TN[j] = \sum_{i=1}^{m} N[i,j] * T[i] < 1,$$

fewer than P subtest failures have occurred and module j is acceptable. If $$\text{Sum} TN[j] = \sum_{i=1}^{m} N[i,j] * T[i] \geq 1,$$

at least P subtest failures have occurred and module j is suspect. Because the devices that depend on the same power supply or serial port may each have several subtests, the value 1/P may occur in N[j] more than P $$\text{Sum} TN[j] = \sum_{i=1}^{m} N[i,j] * T[i]$$

times and may be greater than 1. For complex cases, such as a multi-output power supply where P items use one output and Q items use a different output, some N[i,j]=1/P while others equal 1/Q.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
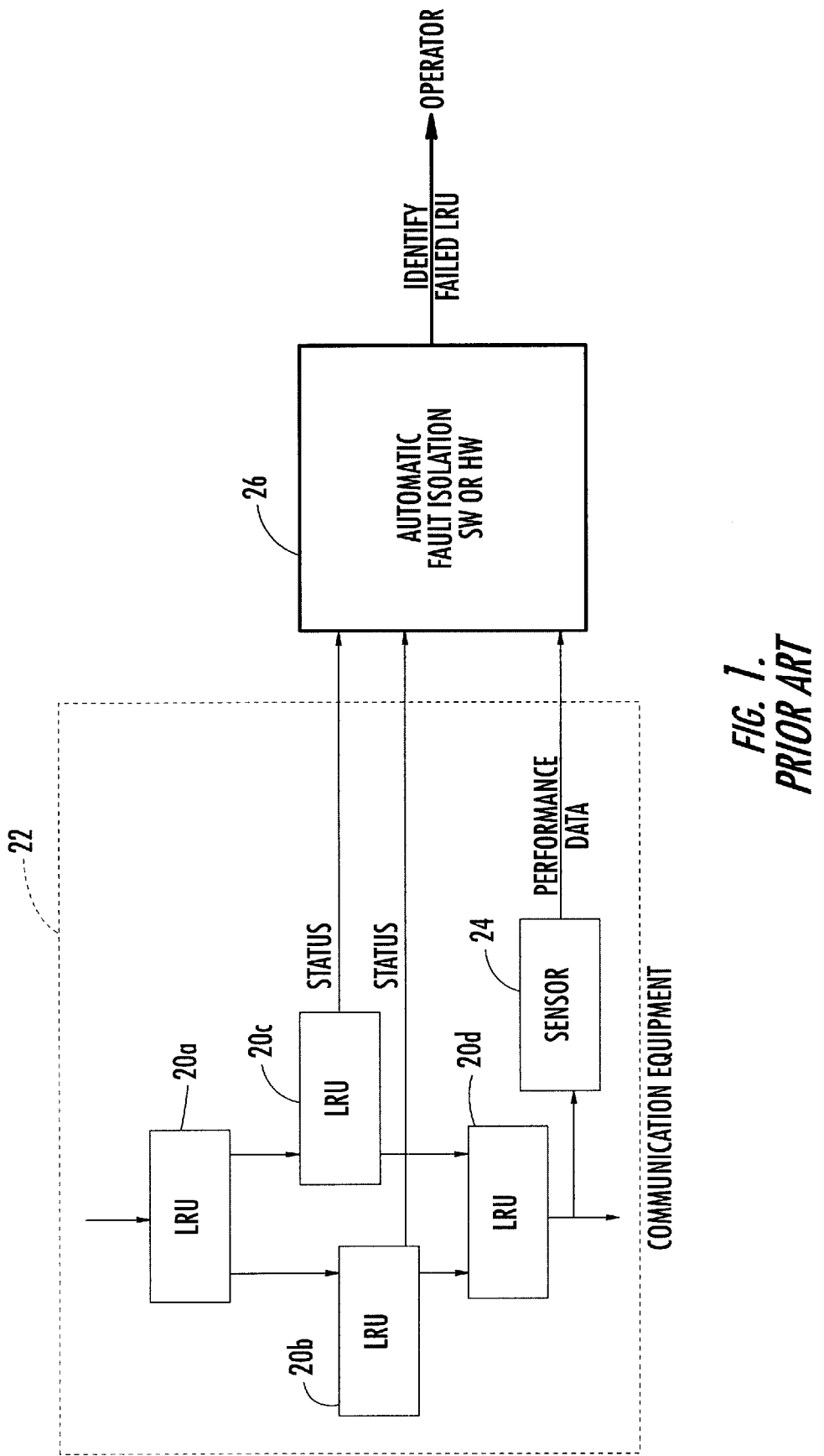
FIG. 1 illustrates a prior art automatic fault isolation system showing an external software or hardware system connected to communication equipment that receives performance data from subtests or status bits from line replaceable units, where a complicated software or hardware module identifies a failed line replaceable unit and notifies an operator.

The method and software, as well as the apparatus and hardware implementation of the present invention, is advantageous because it now allows automatic isolation of item faults and other line replaceable units or "least replaceable units" (LRU) without requiring complicated hardware or software that requires many decision branches. The present invention is advantageous over those prior art devices, such as shown in FIG. 1, which illustrates four line replaceable units 20A–D and a sensor connected to one line replaceable unit at its output to send performance data into a separate automatic fault isolation software or hardware system 26. This prior art type of fault isolation also is not advantageous because it sends status reports or status bits to a separate automatic fault isolation software or hardware system, such as shown by the status lines in FIG. 1.

The present invention, on the other hand, is advantageous because it now uses matrices having data that has extracted within them symptom dependent knowledge. Thus, it is now possible to predict by analysis, and verify by experiment which item failures may cause which subtests to fail. In accordance with a basic aspect of the present invention, "M" can be the number of subtests and "N" can be the number of items. Y[] can be a predetermined M by N matrix where $Y[i,j]=1$, if item j can cause subtest i to fail, and 0 otherwise. T[] can be a vector of M subtest results where $T[i]$ equals 1 if subtest i fails, and 0 otherwise. If subtest i fails, any module j for which $Y[i,j]=1$ is suspect. In general, $S[j]=Y[i,j]*T[i]$, which equals the number of observed subtest failures that a failure of an item can explain. Any item j is suspect if $S[j]$ is greater than 0. The item with the greatest $S[j]$ is the largest single explanation of the observed symptoms.

Figure 2:
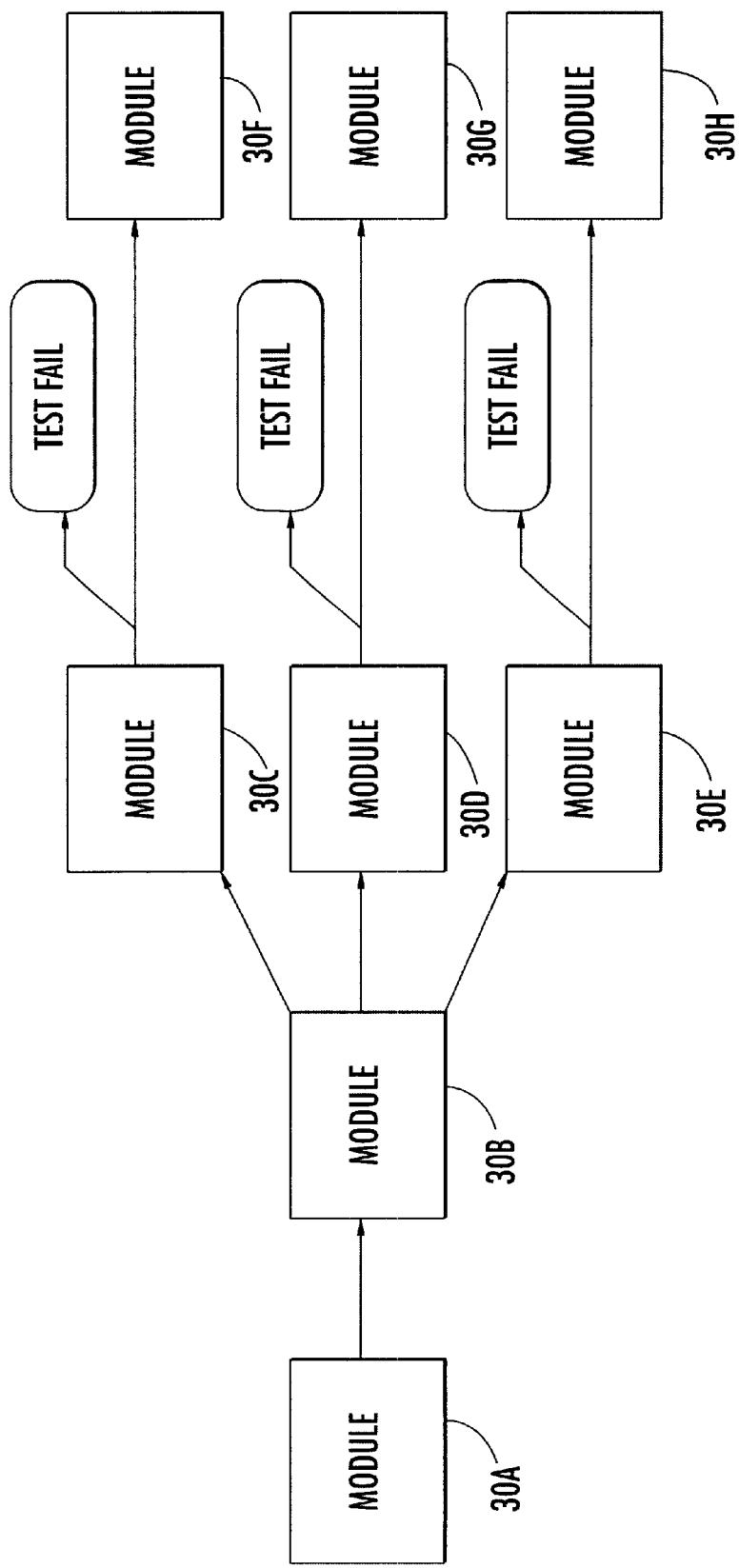
FIG. 2 is a schematic block diagram illustrating how the failure of one module can cause observed test failures in multiple test modules.
Figure 3:
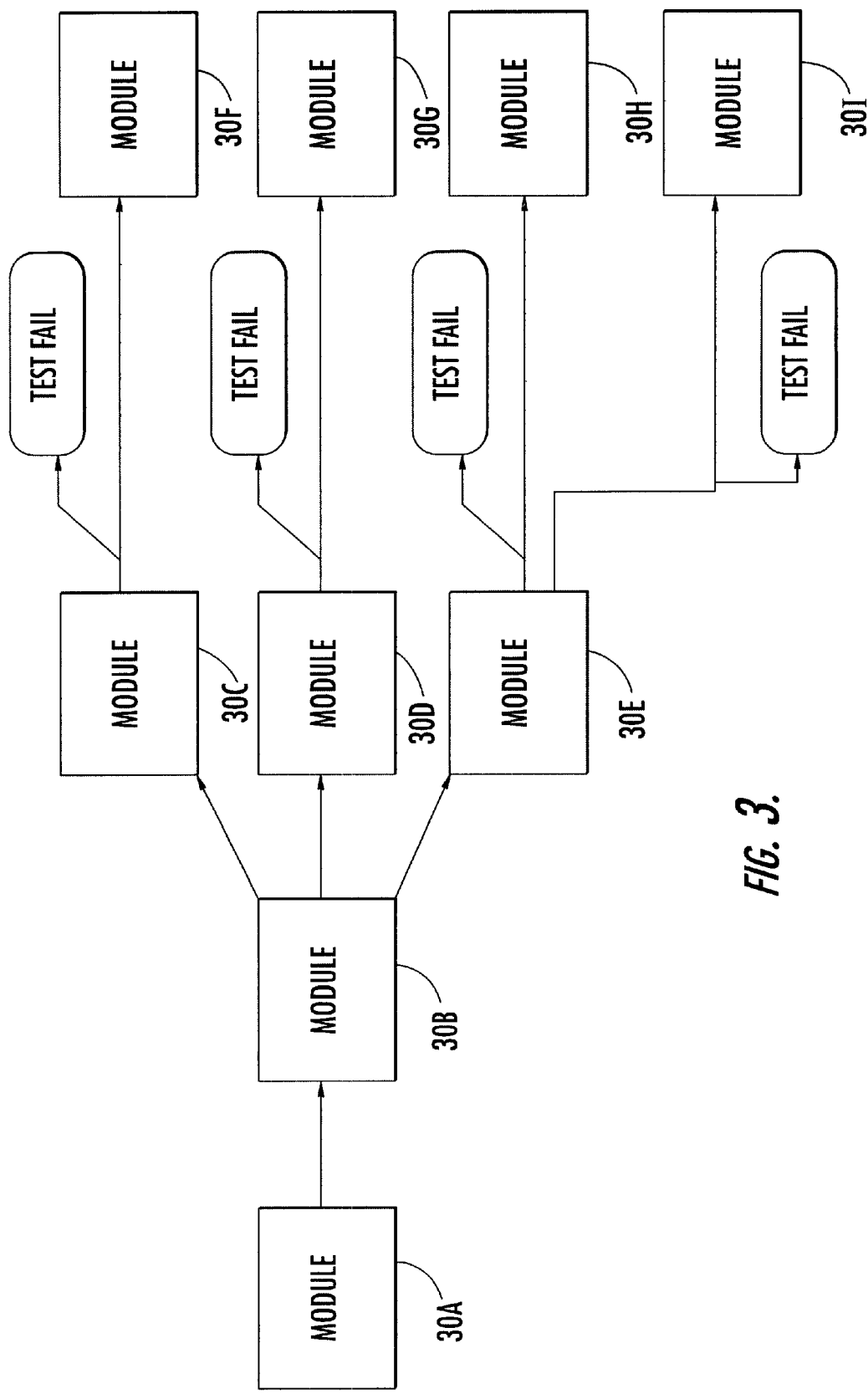
FIG. 3 is a schematic block diagram similar to FIG. 2, but showing an additional module receiving an input from a module.

FIG. 2 illustrates how both items 30A and 30B can be required to provide necessary signal inputs so that a failure of either item 30A or 30B can cause the observed test failures resulting from item 30C–E that feed respective items 30F"H. The method and apparatus of the present invention will identify both 30A and 30B as potentially failed. Both items can explain the number of observed failures so the algorithm will identify item 30A or 30B as the primary failed line replaceable unit depending on which has a higher respective failure rate. FIG. 3 is similar to FIG. 2 showing the addition of item 301 as dependent on item 30E, where the present invention is also applicable.

Figure 4:
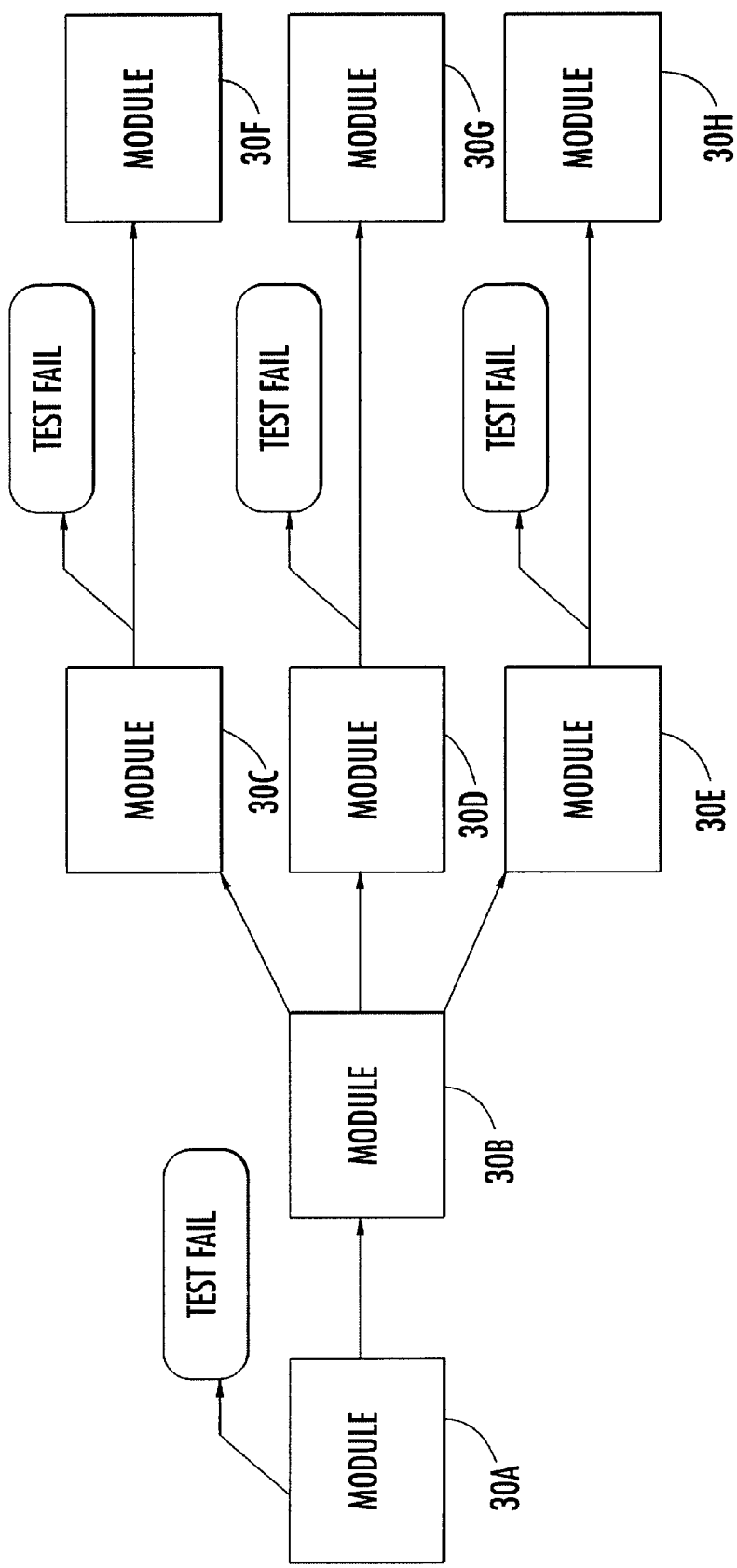
FIG. 4 is a schematic block diagram illustrating how the method and apparatus of the present invention can look "upstream" in the signal (or failure causality) flow to identify a single power module that could cause all the observed subtest failures.

In FIG. 4, the block diagram shows how the method and apparatus of the present invention can look "upstream" in the signal (or failure causality) flow to identify a single module 30A that could cause all of the observed subtest failures of items 30C–E.

Figure 5:
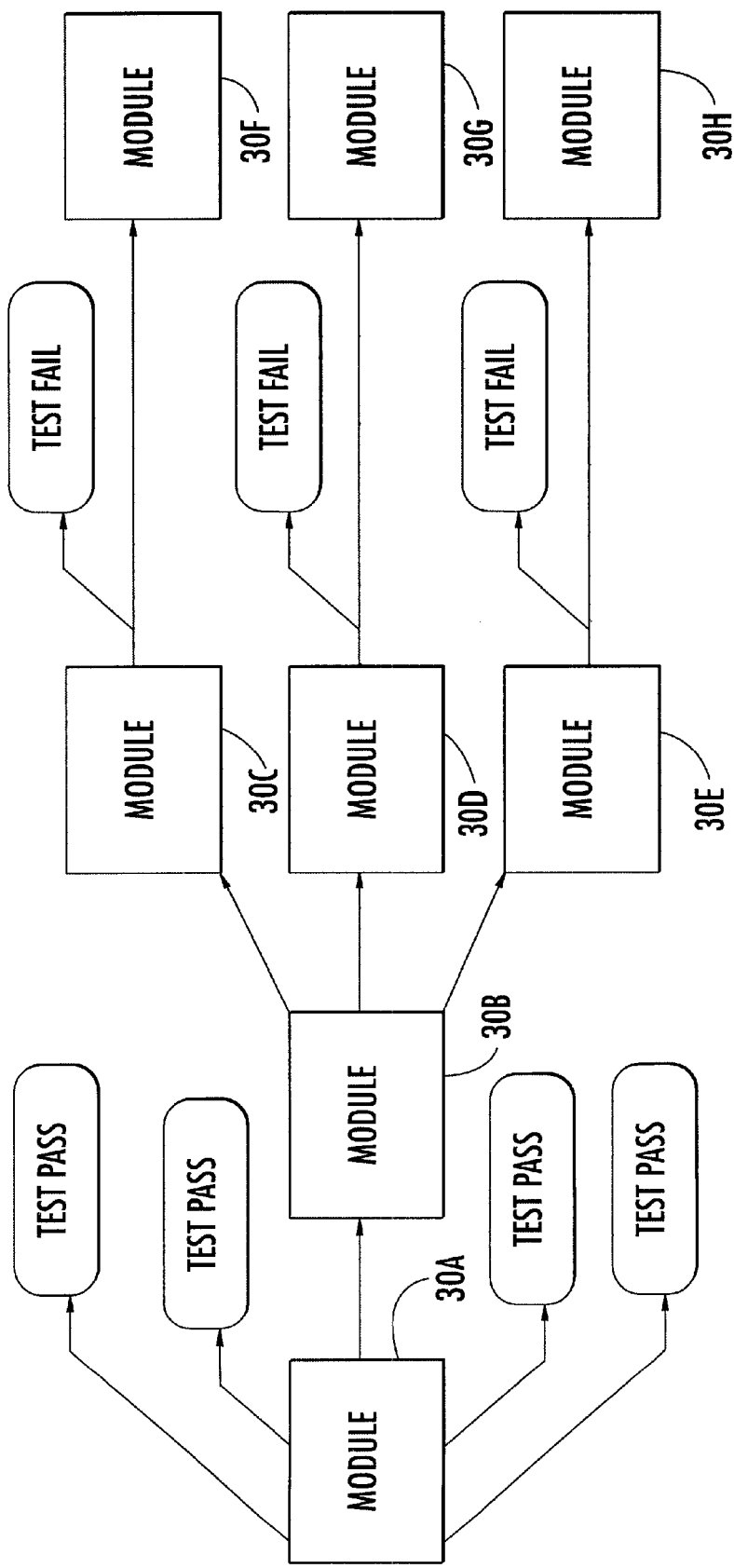
FIG. 5 is a schematic block diagram that shows how some modules can be proved operative if a combination of subtests passes.
Figure 6:
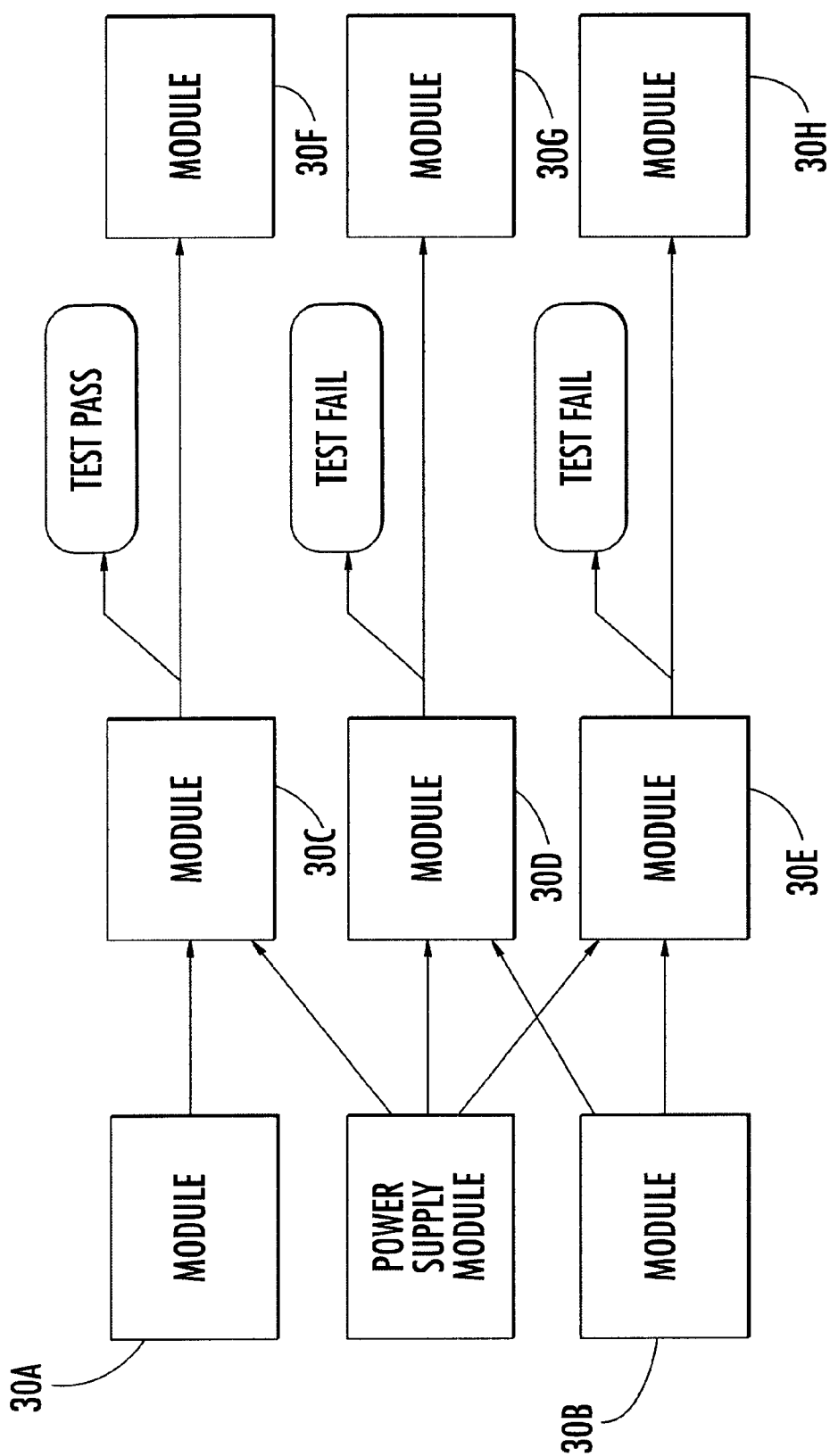
FIG. 6 is a schematic block diagram illustrating how some power modules can be proved operative if any of a set of subsets passes.
Figure 7:
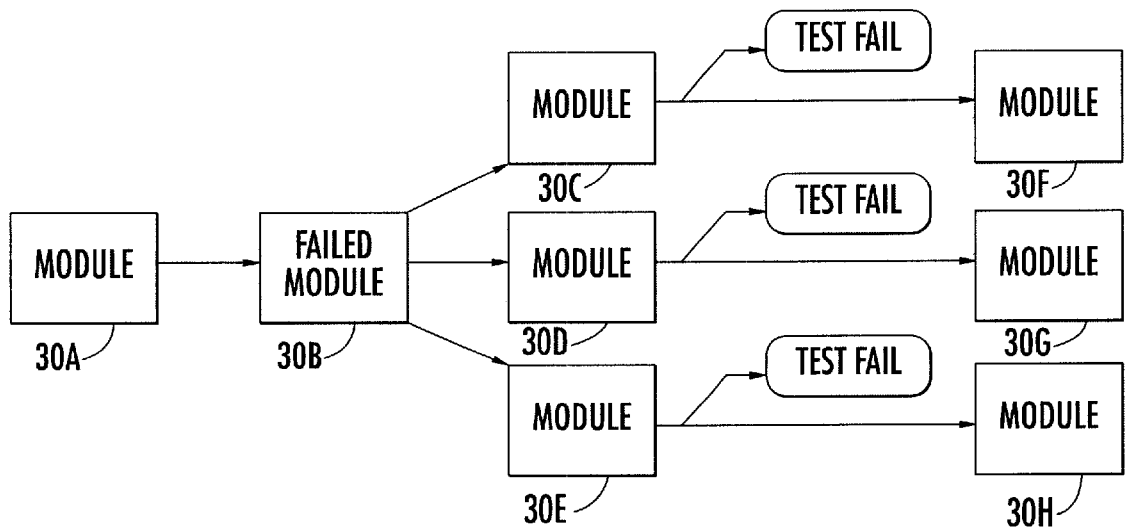
FIG. 7 is another schematic block diagram illustrating how module failures can make several subtests fail.
Figure 8:
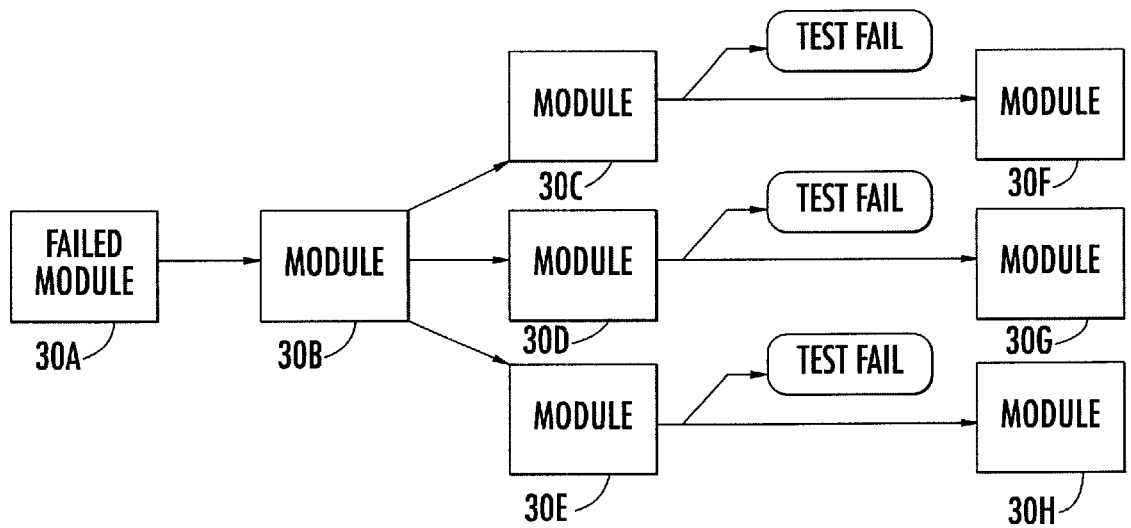
FIG. 8 is another schematic block diagram illustrating how different module failures can cause similar patterns of subtest failures.
Figure 9:
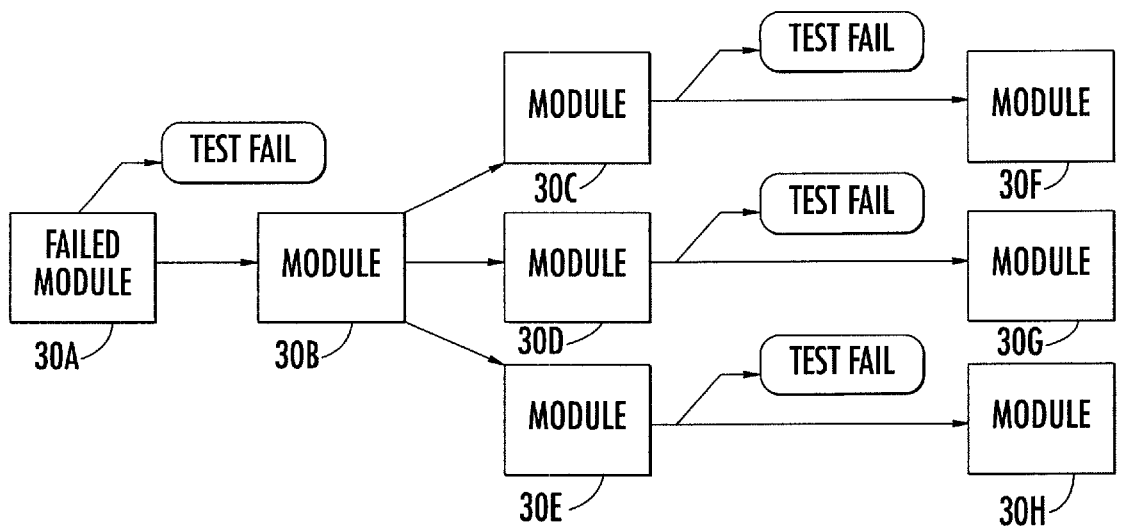
FIG. 9 is another schematic block diagram illustrating how the method and apparatus of the present invention can look "upstream" in the signal to identify a single module that could cause all observed subtest failures.
Figure 10:
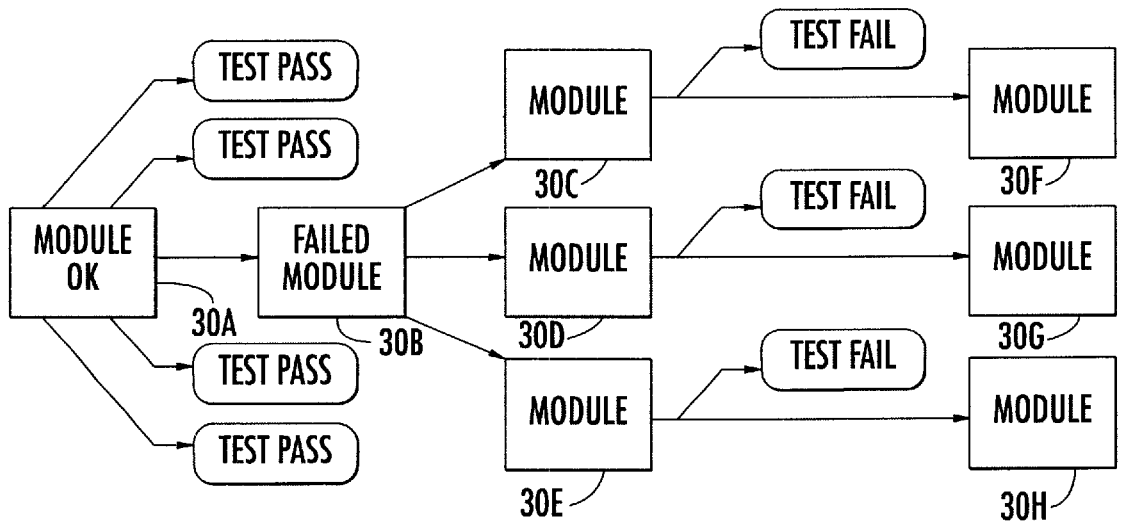
FIG. 10 is another schematic block diagram illustrating how some modules are operative if a combination of subtests passes.
Figure 11:
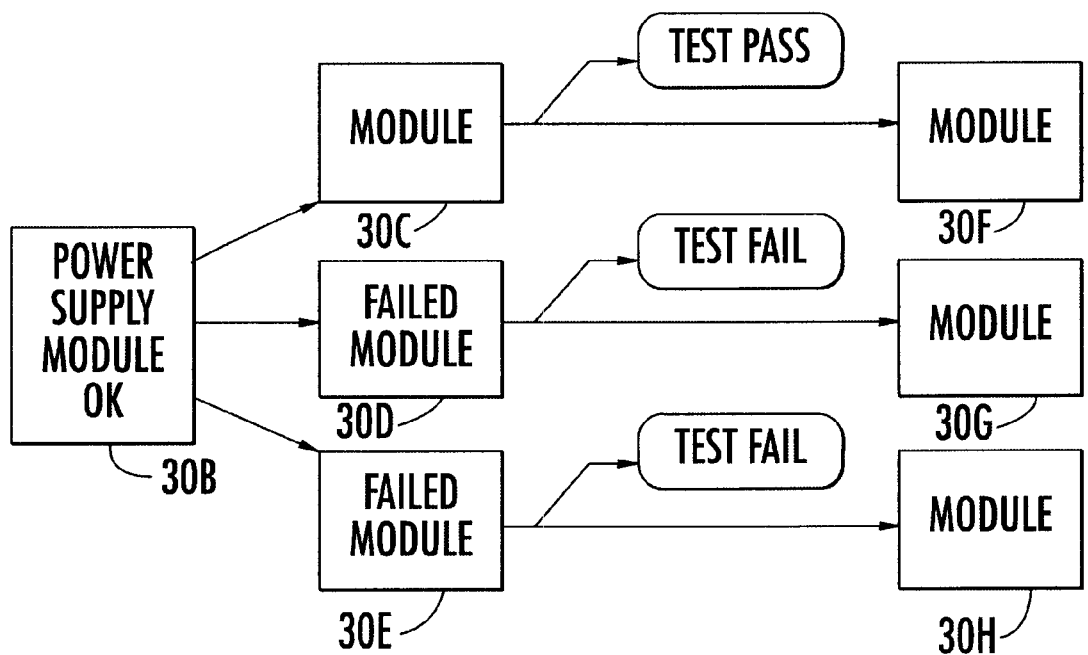
FIG. 11 is a schematic block diagram illustrating how some modules can be proved operative if any one set of subtests passes, such as if several modules depend on a power supply, and if any of these modules passes its subtests, the power supply must be operative.

FIG. 5 is another schematic circuit diagram that illustrates how some items and line replaceable units can be proved operative if a combination of subtests passes, while FIG. 6 illustrates how some items and line replaceable units can be proved operative if any of a set of subtests passes. FIGS. 7–11 are diagrams similar to FIGS. 2–6 and showing similar circuit diagrams, but with emphasis on the failed items. Like reference numerals apply in FIGS. 7–11, as in FIGS. 2–6.

The method and apparatus of the present invention is advantageous and effective in fault analysis for the following situations:

Items that sometimes cause multiple subtest failures (symptoms);

Items that can cause varying patterns of subtest failures;

Single subtests that can prove an item is okay;

Groups of subtests that can prove an item is okay;

A majority vote of subtests that can prove an item is okay;

Multiple simultaneous item failures—it identifies multiple possible failed items;

Item failures that cause other items to appear failed—it picks the root cause of the most subtest failures;

Items that cause similar or even identical failure patterns—it picks the item with the higher failure rate;

Items that have or do not have individual fault status or subtests;

Both item fault status bits and software diagnostic subtests;

Subtests which can fail when any of a group of items fails;

Anomalous or unforeseen patterns of subtest failures—it identifies multiple possible failed items.

Separating the system-specific data into a simple tabular data structure makes any resulting code generic and reusable. The tabular data is easier for the hardware fault analyst to work with than code with special case branches. The algorithm only needs to run if any subtest failures exist, so it should not impact real-time software loading. The technique can be applied to both on-line and off-line tests, and to many types of equipment.

The algorithm uses existing techniques used in fault detection, which includes both item and fault status bits and software diagnostic subtests. These subtest results become the inputs used for fault isolation. The algorithm automatically adapts itself to whatever degree of fault isolation the subtests support, and automatically picks the primary item failure that best explains the observed subtest failures. To handle cases of multiple failures, unforeseen or anomalous results, and non-specific subtests, it also identifies alternate possible failed items. It is important to identify alternate possible failed items because replacing the primary suspected item may not always fix the problem.

When one item failure can explain all of the observed subtest failures, the algorithm will report that item as the primary failed item, and report other items, that explain some of the subtest failures, as secondary failed items. When no single item failure can explain all of the observed subtest failures, the algorithm will iteratively report primary and secondary item failures until the list of primary module failures explains all of the observed subtest failures.

The algorithm is isolating to items, which can be LRU's, sub-LRU's, chassis, or any desired level of isolation. The level of isolation is defined by the tabular data structures used in the algorithm, rather than being hard coded into the AFI algorithm. In order to provide more useful diagnostic information to a user, it is possible to isolate LRU's or sub-LRU items. An external operator maintenance manual, or a simple optional software lookup function, could map the sub-LRU items into LRU's so any user would know what LRU to repair or replace.

A maintainer could first replace the LRU or LRU's containing the primary identified failed item or items, then restart the system and trigger fault isolation again. If the fault still occurs, the maintainer could try replacing other LRU's containing the secondary items identified by the fault isolation. If faults still occur, any operator manuals could suggest testing cables, verifying the signals leading to or from the identified potentially failed items, or other manual maintenance techniques known to those skilled in the art.

The system analyst can predict by analysis and verify by experiment which item failures may cause which subtests to fail. Let m be the number of subtests and n be the number of items. Let Y[] be a predetermined m×n matrix where Y[i,j]>0 if item j can cause subtest i to fail, and Y[i,j]≦0 otherwise. For purposes of description, the first value will be described throughout as a 1. The second value will be described as a 0. Let T[] be a vector of m subtest results where T[i]>0 if subtest i fails, and ≦0 otherwise. Then if subtest i fails, any item j for which Y[i,j]=1 is suspect. In general, $$S[j] = \sum_{i=1}^{m} Y[i, j] * T[i]$$

equals the number of observed subtest failures that are explained by a failure of item j. Any item j is suspect if S[j]>0.

Majority Voting

By using fractional values in N and comparing the result to a non-zero threshold, a single matrix N can provide: (1) single subtests that can each prove an item is okay; (2) groups of subtests that together can prove an item is okay; and (3) a majority vote of subtests that can prove an item is okay or suspect.

To handle cases where items can be proved acceptable if a combination of subtests all passes, let N[] be a predetermined m×n matrix where N[i,j]=1 if subtest i is part of a set of subtests that together can prove item j is acceptable, and 0 otherwise. Then $$\text{Sum } N[j] = \sum_{i=1}^{m} N[I, j] > 0$$

if some set of subtests can prove item j is acceptable, and if $$\text{Sum} TN[j] = \sum_{i=1}^{m} N[i, j] * T[i] < 1,$$

then all subtests in this set pass and item j is acceptable. If item j is acceptable, the system sets S[j]=0. If $$\text{Sum} TN[j] = \sum_{i=1}^{m} N[i, j] * T[i] \geq 1,$$

then at least one subtest in the set failed so the item is suspect.

To handle cases where items can be proved acceptable if any one of a set of P subtests passes, let N[i,j]=1/P if subtest i alone can prove item j is okay, and 0 otherwise. Then if $$\text{Sum} TN[j] = \sum_{i=1}^{m} N[i, j] * T[i] < 1,$$

at least one subtest in this set passed and item j is acceptable. If module j is acceptable, the system sets S[j]=0. If $$\text{Sum} TN[j] = \sum_{i=1}^{m} N[i, j] * T[i] = P/P = 1,$$

then all of the P subtests in the set failed so the item is suspect.

A fractional value of N[i,j] also provides the majority voting capability. This is useful where multiple devices connect to and depend on the same signal, such as a power supply or serial port. If a majority of the devices are working, the power supply or serial port must be acceptable. But if a majority of the devices show power-related or communication faults, the power supply or serial port is suspect. The threshold can also be set to an application-dependent value rather than a simple majority. In either case, let N[i,j]=1/P if fewer than P subtest failures prove that item j is acceptable, and 0 otherwise. Then if $$\text{Sum} TN[j] = \sum_{i=1}^{m} N[i, j] * T[i] < 1,$$

fewer than P subtest failures have occurred and item j is acceptable. If $$\text{Sum} TN[j] = \sum_{i=1}^{m} N[i,j] * T[i] \geq 1,$$

at least P subtest failures have occurred and item j is suspect. Because the devices that depend on the same power supply or serial port may each have several subtests, the value 1/P may occur in N[j] more than P times and $$\text{Sum} TN[j] = \sum_{i=1}^{m} N[i,j] * T[i]$$

may be greater than 1. For complex cases, such as a multi-output power supply where P items use one output and Q items use a different output, some N[i,j]=1/P while others equal 1/Q.

The dot product of T[] and each column of N[] can also be thought of as a correlation of expected and observed fault symptoms with a different weighting than Y[]. Y[] tends to define the maximum set of symptoms that an item can produce, while N[] tends to define a minimum set of symptoms that must occur for the item to be suspect. If the correlation of T[] and a column of N[] is too weak, the item is acceptable.

After the system calculates S[] and proves some items are acceptable using N[], multiple items may still be suspect if S[] has multiple non-zero entries. In this case, finding the largest value of S[] tells the system which single item failure explains the greatest number of subtest failures. The system reports this item as the most likely single failure, and the other items with non-zero S[] as alternate possible failures. The dot product of T[] and each column of Y[] can also be thought of as a correlation of expected and observed fault symptoms. The item that produces the greatest correlation of T[] and its column of Y[] is the best explanation for T.

If there is a tie for the largest value of S[], the system reports the item with a greater estimated failure rate. The estimates FP[] only need to be adequate enough for ranking the items by failure rate.

Failure rate as a secondary criteria can be replaced by or combined with some other criteria such as ease of replacement. This only changes the FP vector data, not the algorithm. It is useful to make FP slightly higher for an item A with a status output than for another item that passes the status of item A to the processor. This makes item A the primary failure when item A status is the only fault symptom present.

Subtest Status

Many subtests in certain systems could be manual, i.e., only run on operator command. Other tests, however, may only be executed under certain operating conditions. The automatic fault isolation (AFI) algorithm must function whether these subtests have been done or not. Thus, in this case T[i]=1 means that a subtest i has run and failed, but T[i]=0 does not mean that subtest i has run and passed. This does not impact the equation:

$$S[j] = \sum_{i=1}^{m} Y[i,j] * T[i]$$

where only observed failures matter and tests passed do not matter. One way to track subtest status is a new vector Trun[], where Trun[i]=1 if T[i]=the result of completing subtest i. The system could change the equation for S[] to:

$$S[j] = \sum_{i=1}^{m} Y[i,j] * T[i] Trun[i]$$

but this would not change the result, because we never set T[i]=1 without running the test, i.e., when Trun[i]=0.

However, using N[] to prove that an item is acceptable depends critically on which tests were actually run and passed. The previous test using N[] must be modified to qualify T[] with Trun[], such that T[i]=0 only if subtest i has run and passed. One way to do this is to substitute T[i]+1−Trun[i] {T[i] OR NOT Trun[i] for a logic implementation} for T[i], so that we prove module j is okay and set S[j]=0 only if $$\text{Sum} TN[j] = \sum_{i=1}^{m} N[i,j] * (T[i] + 1 - Trun[i]) < 1$$

and $$\text{Sum } N[j] = \sum_{i=1}^{m} N[i,j] > 0.$$

Iterative Operation

In order to locate an item failure that best explains the observed symptoms, the algorithm selects the primary item failure that explains the greatest number of subtest failures. It also designates any other item failure which explains a smaller number of subtest failures as a secondary failure. This yields the desired results as long as the system assumes that only one item failure may occur at a time. Items that can cause only one subtest failure will always rank low as secondary failures. But if the system assumes multiple simultaneous item failures, a single iteration of this algorithm might rank possible failed items which happen to have many subtests, ahead of another actually failed item which has only one subtest. If the software reports only a fixed number of secondary possible failed items to the customer equipment, the system might then fail to report that actually failed item which has only one subtest.

Running the algorithm iteratively will prevent this problem. This means reusing the existing subtest results, not running the subtests again. After recording primary and secondary failed items in the first iteration, the system will remove from the subtest vector T[] all subtest failures which the primary failure can explain. To do this, the system sets T[]=T[] AND NOT Yx[], where Yx[] is the column of Y[] for the primary failed module. If any failures remain in T[] that the primary failure could not explain, the system runs the basic algorithm again and records any further primary and secondary failed items. The system continues this until no subtest failures are left in T.

Because the first iteration secondary failure list will include all items that can explain any of the observed subtest failures, it will include any items which may later become primary failures. The system should complete all iterations, and change the status of these items from secondary to primary, before reporting results to the user equipment. The inclusiveness of the algorithm first iteration secondary failure list also means that it will identify no new secondary failed items after the first iteration.

PDL

In accordance with the present invention, there are described two different methods to implement the algorithm.

The first uses integer or float data with arithmetic operations, while the second uses mainly logical data and operations. Either approach can be used in many systems at the software engineer's discretion. Using bit-packed logical data would reduce the size of the Y and N matrices. In some systems and languages, bit-packed logical operations could reduce the execution time drastically. The algorithm could also be accomplished in hardware.

Algorithm Numeric PDL A

```
Y[ ]=a predetermined m × n matrix       - -Y[i,j]=1 if module j can cause subtest i to fail
N[ ]=a predetermined n × n float matrix - -N[i,j]>0 for subtests that can prove module j is OK
FP[ ]=float n vector of estimated module failure rates  - -scaled so that all are < 1
T[ ]=m vector of subtest results        - - = 1 for failures
Trun[ ]=m vector of subtest status      - - = 1 for subtests actually run
Status[ ]=vector of module fault status - - = OK, primary and secondary
- -Initialize module status vector
FORj=1 TO m                             - - j=module index
    Status[j]=OK
END FOR
Iteration Flag=1                        - - =1 to iterate, 0 if done
WHILE (Iteration flag =1) DO
    - -Calculate S[ ]
    FOR j=1 TO m
    S[j] = 0
    SumN = 0
    Sum TN = 0
    FOR i = 1 TO n
        S[j]=S[j] + Y[i,j]*T[i]
        SumN = SumN + N[i,j]
        SumTN = SUMTN + (T[i] + 1 − Trun[i])*N[i,j]
    END FOR
    IF (SumN > 0 AND SumTN < 1) THEN S[j] = 0
    END FOR
    FailNum = 1                         - -index of primary failed module
    - - Determine primary failure
    FOR j = 2 TO m
        IF ((S[j]>S[FailNum] } OR (S[j]=S[FailNum] AND FP[j]>FP[FailNum]))
            THEN FailNum = j
    END FOR
    - -Update module status vector. Primary overrides Secondary overrides OK
    Status [FailNum] = Primary
    For j = 1 TO m
        IF (Status[j] = OK AND S[j] > 0) THEN Status [j] = Secondary
    END FOR
    - -Update T[ ] based on new primary failure FailNum, and test if T is now empty
    Iteration Flag = 0
    FOR i = 1 TO n                      - -subtest index
        IF Y[i,FailNum] = 1 THEN T[i] = 0  - -remove T results explained by primary failure FailNum
        IF T[i] = 1 THEN Iteration Flag = 1 - -test if T is now empty
    END FOR
END WHILE
```

Algorithm Logical PDL B

Much of the algorithm can be implemented with logical rather than arithmetic operations. If desired, the logical operations can be done bitwise, i.e., on all bits in a binary word at once.

S[i,j] must be an integer or float because it counts how many symptoms an item failure may explain.

Assuming the failure probabilities are expressed as numbers less than one, the secondary comparison on FP[j] are combined with the primary comparison on S[j] simply by comparing s[j]+FP[j].

SumN can be precomputed and stored as a constant float vector.

```
Y[ ]=a predetermined logical m x n matrix   - - =1 if module j can cause subtest i to fail
N[ ]=a predetermined m x n float matrix     - - N[i,j]>0 for subtests that can prove module j is OK
FP[ ]=float n vector of estimated module failure rates  - - scaled so that all are < 1
T[ ]=logical m vector of subtest results    - - =1 for failures
Trun[ ]=m vector of subtest status          - - =1 for Subtests actually run
Status[ ]=vector of module fault status     - - =OK, Primary or Secondary
- -Initialize module status vector
FOR j = 1 TO m                              - - j = module index
    Status[j] = OK
END FOR
Iteration Flag = True                       - - = True to iterate, 0 if done
WHILE (Iteration Flag) DO
    - - Calculate S[ ]
    FOR j = 1 TO m                          - - j = module index
        S[j] = 0                            - - float
        SumN = 0                            - - float, >0 if subtests can prove that module j is OK
        SumTN = 0                           - - float, <1 if subtests prove that module j is OK
        FOR i = 1 TO n                      - -subtest index
            IF (Y[i,j] AND T[i]) THEN S[j] = S[j] + 1
            SumN = SumN + N[i,j]
            IF (T[i] OR NOT Trun[i])) THEN SumTN = SumTN + N[i,j]
        END FOR
        IF (SumN > 0 AND SumTN < 1) THEN S[j] = 0
    END FOR
    - - Determine primary failure
    FailNum = 1                             - - index of primary failed module
    FOR j = 2 TO m
        IF (S[j] + FP[j] > S[FailNum] + FP[FailNum]) THEN
            FailNum = j
    END FOR
    - - Update module status vector. Primary overrides Secondary overrides OK.
    Status [FailNum] = Primary
    FOR j = 1 TO m
        IF (Status[j] = OK AND S[j] >0) THEN Status[j] = Secondary
    END FOR
    - - Update T[ ] based on new primary failure FailNum, and test if T is now empty
    Iteration Flag = False
    FOR i = 1 TO n                          - - subtest index
        T[i]=T[i] AND NOT Y[i,FailNum]      - - remove T results explained by primary failure FailNum
        Iteration Flag=Iteration Flag OR T[i]  - - = False if T is now empty
    END FOR
END WHILE
```

It is also possible to use a spreadsheet application. The spreadsheet could simulate the entire algorithm with iteration.

In one applied situation, most of the sheets of the spreadsheet could be named for the algorithm variable they contain. Y and N could have a column for each module, and a row for each subtest result. The other sheets would be set up to handle more than one vector T of subtest results, so that they would have a column for each complete test case (vector T of subtest results). T would have a row for each subtest, while Sraw, SumTN, SumN, S and Status would have a row for each module.

Sraw would be the S vector before setting any entries to 0, while S would be the S vector with some entries set to 0 based on N. Sheet Status would be the final result, expressed as P for the single most likely module failure and S for secondary failure possibilities.

To see the results of the algorithm, the data in sheets Y, T, Trun, N, would be changed, and then the Update run under a Tools menu and the results located at in sheet Status. To change the assumptions about how subtest results relate to module failures, sheets Y or N could be changed. Intermediate results could be viewable on the other pages.

Logic Verification

If the input data structures Y, N or NN were incorrect, some values of the subtest result vector T might lead to no identified module failures. It can be seen that adding a subtest failure to any previous set of failures in the subtest result vector T will cause:

Greater or equal number of non-zero values in:

$$S[j] = \sum_{i=1}^{m} Y[i, j] * T[i]$$

Greater or equal number of non-zero values in:

$$\text{Sum}TN[j] = \sum_{i=1}^{m} N[i, j] * T[i]$$

Greater or equal number of non-zero values in SumTN[j] will set fewer or equal values in S[j] to zero.

Greater or equal number of non-zero values in the final S[j] will cause the algorithm to identify a greater or equal number of secondary failed modules.

Therefore, if single subtest failures always cause the algorithm to identify at least one failed module, any pattern with at least one subtest failure will always lead to at least one failed module.

The following chart is an example of subtests for a servomotor application.

| Subtest Examples | | | |
|---|---|---|---|
| Apex Resolver signal loss | o | y | Result=fault if the Channel 5 bit (11) in the Resolver to Digital Card status register=0. |
| Apex Servoamp Fault | o | y | Disregard Apex Servoamp Status for BrakeAmpDelay msec after a change in ACU Global Enable Command or ACU Apex Operate Command. Result=fault if Apex Servoamp Status=0 AND ACU Global Enable Command is true AND ACU Apex Operate Command is true. |
| Apex Servoamp On Error | o | y | Disregard Apex Servoamp Status for BrakeAmpDelay msec after a change in ACU Global Enable Command or ACU Apex Operate Command. Result=fault if Apex Servoamp Status=1 AND (ACU Global Enable Command is false OR ACU Apex Operate Command is false) |
| Apex_motor_ current too high | M | y | Average CurrHighNumSamples samples of Apex_motor_Current. Result=fault if Apex_motor current>PolCurrFaultLimit amps. |
| Apex_motor_ tach mismatch | M | n | Disregard this subtest for BrakeAmpLoopDelay msec after a change in ADU CCA-1 PCU Selectino Status, ACU Global Enable Command or ACU Apex Operate Command. Separately average VelIntTime seconds of Apex_motor_tach and Apex_velocity_command (Should be zero if off-line). Result=fault if \| Apex_motor_tach − Apex_velocity_command \| > ApexVelBias + ApexVelScale* \| Apex_velocity_command \| deg/sec |

Figure 12A:
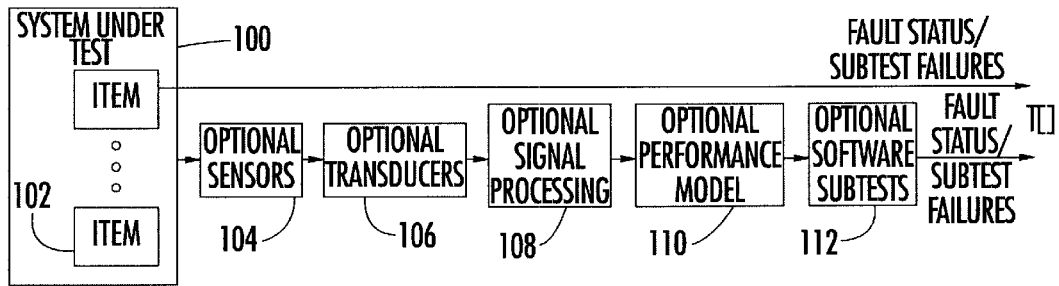
FIGS. 12A, B and C are detailed block diagrams illustrating aspects of the method of the present invention.
Figure 12B:
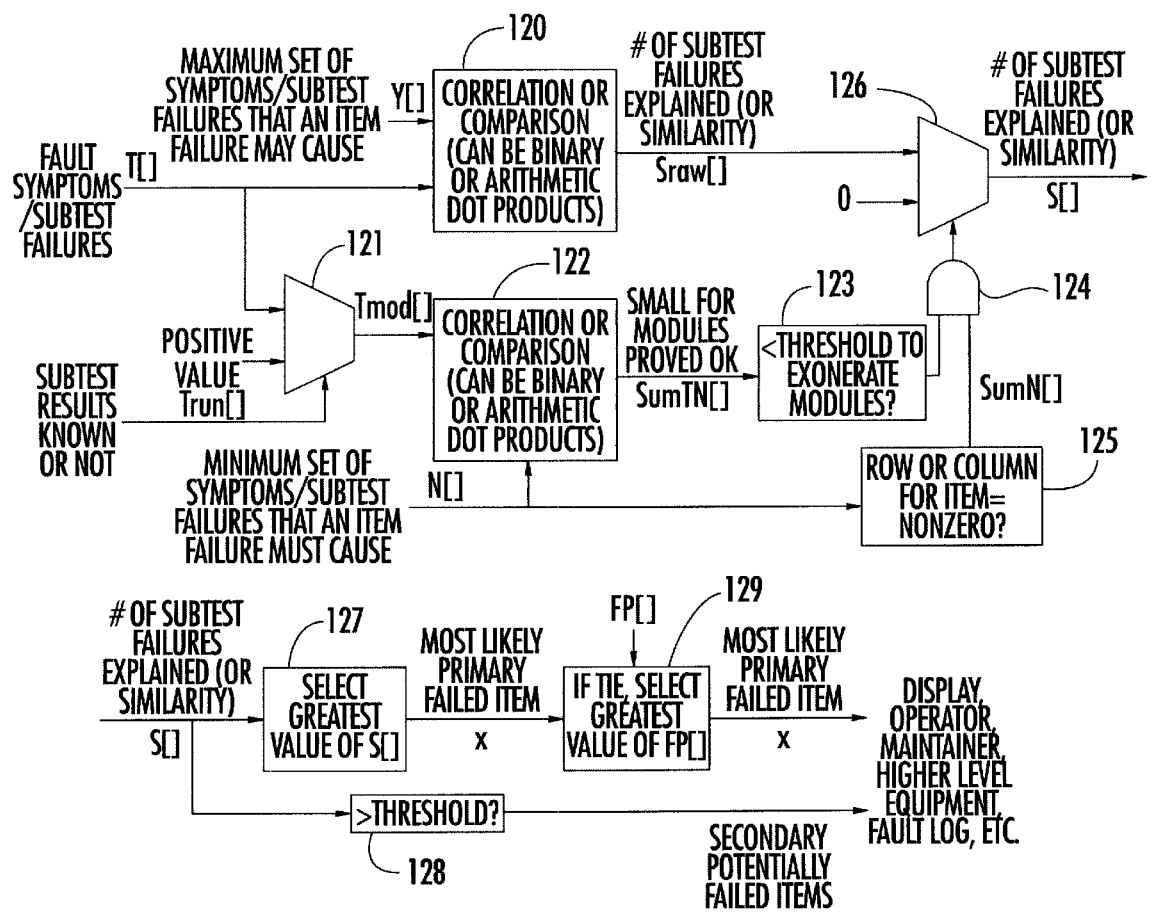
Figure 12C:
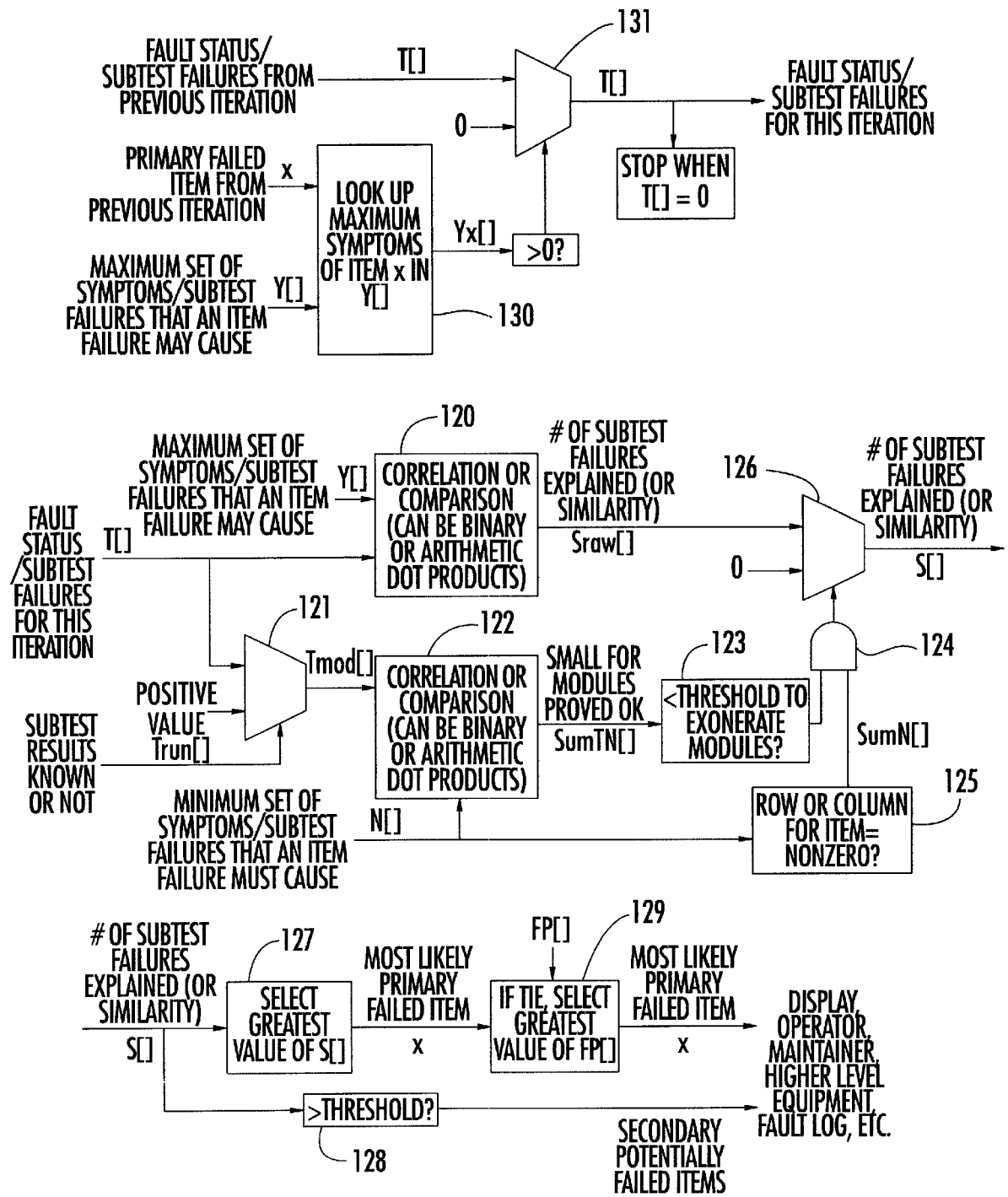

FIGS. 12A–12C illustrate the entire fault isolation algorithm, including a variety of fault status sources, accommodation of subtest results known or not, tie breaking and iteration.

FIG. 12A shows a system under test at block 100 which includes items 102 that may provide fault status. The system under test 100, or the fault isolation system comprising blocks 120–131, may include optional sensors 104, optional transducers 106, optional signal processing hardware or software 108, optional performance models 110, and optional software subtests 112 to obtain fault status and subtest failure data T[]. T[] is a vector of subtest results where T[i]=the degree to which subtest i fails or passes, with T[i]>0 for failure and T[i]≦0 for success.

FIG. 12B shows the first stage of algorithm iteration. This is the only stage needed if isolation of multiple independent item failures is not required. Each value of Trun[] indicates whether the result of the corresponding subtest or fault status in T[] is known or not. The matrix Y[] has a column for each item 102 to be fault isolated, and a row for each subtest or fault status in T[]. Each column of Y[] indicates with positive values all of the subtests which that item can cause to fail, or the maximum set of fault status/subtest failures that item may cause. The matrix N[] also has a column for each item 102 to be fault isolated, and a row for each subtest or fault status in T[]. Each column of N[] indicates with positive values the minimum set of subtests which that item should cause to fail, or the minimum set of fault status/subtest failures that item may cause. N[] thus indicates tests which if they pass, tend to prove that an item is not faulted.

By means of binary or arithmetic dot products or other means, block 120 correlates or compares the subtest or fault status T[] with each column of Y[] to produce the vector Sraw[]. Each entry in Sraw[] indicates the number of subtest failures that a failure of the corresponding item could explain, or the degree to which T[] resembles the maximum failure pattern expected for that item.

For each subtest in Tmod[], block 121 selects the corresponding value of T[] if Trun[] indicates the value in T[] is known, or a positive value, such as 1, if the value in T[] is not known. Blocks 121 and 131 are drawn as multiplexers, which correspond to a software branch or case statement. Depending on the computer language and choice of data types, these blocks might instead be implemented as AND or multiply operations. Tmod[] is a modified version of T[] where subtest results whose value is unknown are set to a positive value that indicates a fault. This distinguishes subtests that did not run from those that passed.

By means of binary or arithmetic dot products or other means of pattern matching, block 122 correlates or compares the subtest or fault status T[] with each column of N[] to produce the vector SumTN[]. Each entry in SumTN[] indicates the number of minimum expected subtest failures that a failure of the corresponding item could cause, or the degree to which T[]resembles the minimum failure pattern expected for that item. A small value of SumTN indicates that an item has probably not failed, because subtest failures expected if it did fail are missing.

For each item in SumTN[], block 123 compares the entry in SumTN[] to a positive threshold. Where SumTN is below the threshold, the result is 1 or otherwise 0. For each item, block 125 outputs a 1 in the vector SumN[] if the corresponding column of N[] has any non-zero entries, or otherwise 0. This test is necessary because SumTN=0 for an item that cannot be proved okay and thus has all 0 values in N[]. SumN is a constant and should be pre-computed. For each item, block 124 ANDs these two results to determine which items have non-zero entries in N[] AND have SumTN[] below the threshold, and thus, are proved okay. Based on this result, block 126 sets the entry of the vector S[] for each item to 0 if the item is proved okay, or otherwise to the corresponding entry of Sraw[]. Each entry in S[] is now positive for items still suspect, or 0 for items never suspected or proved okay.

To find the most likely failed item which explains the most subtest failures and has the best match of actual and expected failure patterns, block 127 selects the primary failed item(s) with the greatest value of S[]. If a tie occurs, block 129 breaks the tie by selecting the primary failed item with the greatest value of the probability factor FP[]. Block 128 may also optionally compare the values of S[] to a threshold, and select the items with S[] above the threshold as secondary potentially failed items. If the threshold is 0, the system can report all items with non-zero S[] as secondary potentially failed items. If iteration is not required to isolate multiple independent failures, the system reports the primary and secondary potentially failed items as final results to the operator, maintainer, a status display, a fault log, other equipment or elsewhere.

FIG. 12C illustrates how the algorithm can iteratively isolate multiple independent failures if required. This will detect whether or not a single item failure can explain all of the subtest or status failures in T[]. The software that implements FIG. 12C would run repeatedly until it identifies all independent item failures. For the first iteration, the inputs T[] come from FIG. 12B, while in later iterations they come from the previous iteration of FIG. 12C.

Block 130 selects the column of Yx[] corresponding to the primary failed item x identified in the previous iteration. For each entry in T[], block 131 sets that entry to 0 if the corresponding entry in Yx[] is positive, or otherwise leaves it unchanged. This removes from T[] all of the fault status/subtest failures that the previous primary failed item x could have caused. When T[] has no non-zero entries, iteration stops because the algorithm has found all of the independent primary failed items which explain all of the observed subtest or status failures in the initial value of T[].

The remainder of FIG. 12C operates the same as FIG. 12B, except for the source of the fault status/subtest failures to blocks 120 and 121. The outputs from blocks 128 and 129 should be accumulated over the successive iterations, to give the operator the full list of primary failed items.

It should be understood that there may be multiple instances of sensors, transducers, signal processing, performance models, software subtests, etc. These sensing elements may be part of the system under test, or may be part of the fault isolation system, or may all be part of the single system which fault isolates itself. The inputs may also be item outputs or signals, or physical conditions present anywhere in the system under test. They may be from equipment in the system which is not part of replaceable or isolatable item. The inputs may also be for multiple items to one element, one item to multiple sensing elements, and similarly from one sensing stage to the next. The sensing elements may be present or absent in almost any number or combination, but usually in the sequence illustrated.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A method of automatically isolating hardware item faults comprising the steps of:

obtaining subtest results T[i] for a plurality of items where T[] comprises a vector of m subtest results and T[i]>0 if subtest i fails and if subtest i does not fail, T[i]≦0;

correlating, comparing or pattern matching the subtest results T[i] with respective matrix values Y[i,j], where Y[] comprises a predetermined m×n matrix where Y[i,j]>0 if item j can cause subtest i to fail and Y[i,j]≦0 if item j does not cause subtest i to fail;

obtaining from the correlation, comparing or pattern matching a value S[j] for each item that is reflective of the number of subtest failures that are explained by a failure of item j, wherein any item j is suspect if S[j]>0; and determining which item has the most likely failure by determining the largest value of S[j] when S[j] has multiple non-zero entries, such that the largest value of S[j] is indicative of the most likely single item failure where any other items with S[j]>a threshold represent alternate possible item failures.

2. A method according to claim 1, and further comprising the step of obtaining subtest status Trun[] for a plurality of n items where Trun[] comprises a vector of m status values and Trun[i]=1 if the result of subtest 1 is known, and further comprising the step of processing subtest results T[i] with Trun[i] so that where Trun(i] indicates an unknown test result, Tmod[i] indicates a subtest failure, processing matrix values N[i,j] with the subtest results Tmod[i], rather than with T[i], to obtain SumTN[j].

3. A method according to claim 1, and further comprising the step of removing any fault symptoms explained by an item with the greatest entry in S[], and the steps of claim 1 to determine what item or items explain the fault symptoms that the item with the greatest entry in S[] did not explain.

4. A method according to claim 1, and further comprising the steps of:

obtaining a predetermined probability factor FP[j] for each item j, where FP reflects relative item failure rates, or ease of item repair or replacement, or other criteria for breaking ties in values of S[] and replacing which item first; and determining which item x has the most likely primary failure from S[j] when S[j] has multiple nonzero entries, and breaking ties based on the largest value of FP[], such that the largest value of S[j], or S[j] and FP[j] for ties, is indicative of the most likely single primary item failure where any other items with S[j] above a threshold represent alternate possible secondary item failures.

5. A method according to claim 1, and further comprising the step of processing subtest results T[i] and matrix values Y[i,j] by multiplying then summing, or logically ANDing then summing.

6. A method according to claim 1, and further comprising the step of finding the largest value of a probability factor FP[i] when there are two or more values S[j] that have substantially the same largest value to determine which item has the most likely failure.

7. A method according to claim 6, wherein the probability factor FP[i] comprises a n vector of estimated item failure rates for respective items.

8. A method according to claim 6, wherein the probability factor FP[i] comprises a n vector for the ease of replacement of respective items.

9. A method according to claim 1, and further comprising the step of initially obtaining a raw number Sraw[j] reflective of all observed subtest failures and processing the raw number Sraw[j] with variables SumN[] and SumTN[] that rule out certain item failures to obtain S[j].

10. A method according to claim 9, and further comprising the step of processing the raw number Sraw[j] by multiplying Sraw[j] with 0 when SumN[]>0 and SumTN[] <a threshold, or with 1 when SumN[]=0 or SumTN[]≧a threshold.

11. A method according to claim 9, and further comprising the step of processing the raw number Sraw[j] by ANDing Sraw[j] with 0 when SumN[]>0 and SumTN<a threshold, or with 1 when SumN[]=0 or SumTN[]≧a threshold.

12. A method according to claim 9, and further comprising the step of processing the raw number Sraw[j] by selecting Sraw[j]=0 when SumN[]>0 and SumTN[]<a threshold, or selecting Sraw[j]=S[j] when SumN[]=0 or SumTN[]≧a threshold.

13. A method according to claim 9, and further comprising the step of deriving SumTN[] and SumN[] from T[] and a predetermined m×n matrix N[] where N[i,j] is greater than 0 if test i alone or along with other tests proves that item j is operative.

14. A method of automatically isolating hardware item faults comprising the steps of:
obtaining subtest results T[i] for a plurality of items where T[] comprises a vector of m subtest results and T[i]>0 if subtest i fails and if subtest i does not fail, T[i]≦0;
correlating, comparing or pattern matching the subtest results T[i] with respective matrix values Y[i,j], where Y[] comprises a predetermined m×n matrix where Y[i,j]>0 if item j can cause subtest i to fail and Y[i,j]≦0 if item j does not cause subtest i to fail; and
obtaining from the correlation, comparing or pattern matching a value S[j] for each item that is reflective of the number of subtest failures that are explained by a failure of item j, wherein any item j is suspect if S[j]>0.

15. A method according to claim 14, and further comprising the step of obtaining subtest status Trun[] for a plurality of n items where Trun[] comprises a vector of m status values and Trun[i]=1 if the result of subtest 1 is known, and further comprising the step of processing subtest results T[i] with Trun[i] so that where Trun[i] indicates an unknown test result, Tmod[i] indicates a subtest failure, processing matrix values N[i,j] with the subtest results Tmod[i], rather than with T[i], to obtain SumTN[j].

16. A method according to claim 14, and further comprising the steps of:
obtaining a predetermined probability factor FP[j] for each item j, where FP reflects relative item failure rates, or ease of item repair or replacement, or other criteria for breaking ties in values of S[] and replacing which item first; and
determining which item x has the most likely primary failure from S[j] when S[j] has multiple nonzero entries, and breaking ties based on the largest value of FP[], such that the largest value of S[j], or S[j] and FP[j] for ties, is indicative of the most likely single primary item failure where any other items with S[j] above a threshold represent alternate possible secondary item failures.

17. A method according to claim 14, and further comprising the step of processing subtest results T[i] and matrix values Y[i,j] by multiplying then summing, or logically ANDing then summing.

18. A method according to claim 14, and further comprising the step of initially obtaining a raw number Sraw[] reflective of all observed subtest failures and processing the raw number Sraw[] with variables SumN[] and SumTN[] that rule out certain item failures to obtain S[j].

19. A method according to claim 18, and further comprising the step of processing the raw number Sraw[j] by multiplying Sraw[j] with 0 when SumN[]>0 and SumTN[] <a threshold, or with 1 when SumN[]=0 or SumTN[]≧a threshold.

20. A method according to claim 18, and further comprising the step of processing the raw number Sraw[j] by ANDing Sraw[j] with 0 when SumN[]>0 and SumTN<a threshold, or with 1 when SumN[]=0 or SumTN[]≧a threshold.

21. A method according to claim 18, and further comprising the step of processing the raw number Sraw[j] by selecting Sraw[j]=0 when SumN[]>0 and SumTN<a threshold, or selecting Sraw[j]=S[j] when SumN[j]=0 or SumTN[]≧a threshold.

22. A method according to claim 18, and further comprising the step of deriving SumTN[] and SumN[] from T[] and a predetermined m×n matrix N[] where N[i,j] is greater than 0 if test i alone or along with other tests proves that item j is operative.

23. A method of automatically isolating item faults in an apparatus comprising the steps of:
obtaining subtest results T[i] for a plurality of items where T[] comprises a vector of m subtest results and T[i]>0 if subtest i fails and if subtest i does not fail, T[i]≦0;
correlating, comparing or pattern matching the subtest results T[i] with respective matrix values Y[i,j], where Y[] comprises a predetermined m×n matrix where Y[i,j]>0 if item j can cause subtest i to fail and Y[i,j]≦0 if item j does not cause subtest i to fail;
obtaining from the correlation, comparing or pattern matching a value Sraw[j] for each item that is reflective of the number of subtest failures that are explained by a failure of item j, wherein any item j is suspect if Sraw[j]>0;
multiplying or ANDing, then summing, the subtest results t[] times a predetermined m×n matrix N[] and comparing the result to a non-zero threshold to determine values SumTN[] that rule out certain item failures;
processing the Sraw[j] with the variables SumTN[] that rule out certain item failures to obtain numbers S[j] for each item; and
determining which item has the most likely failure by determining the largest value of S[j] when S[j] has multiple non-zero entries, such that the largest value of S[j] is indicative of the most likely single item failure, wherein any other items with non-zero S[j] represent alternate possible item failures.

24. A method according to claim 23, and further comprising the step of obtaining subtest status Trun[] for a plurality of n items where Trun[] comprises a vector of m status values and Trun[i]=1 if the result of subtest 1 is known, and further comprising the step of processing subtest results T[i] with Trun[i] so that where Trun[i] indicates an unknown test result, Tmod[i] indicates a subtest failure, processing matrix values N[i,j] with the subtest results Tmod[i], rather than with T[i], to obtain SumTN[j].

25. A method according to claim 23, and further comprising the step of removing any fault symptoms explained by an item with the greatest entry in S[], and the steps of claim 23 to determine what item or items explain the fault symptoms that the item with the greatest entry in S[] did not explain.

26. A method according to claim 23, wherein N[i,j]=1 if success of subtest i along with other subtests proves that module j is okay, and $$\operatorname{Sum} N[j] = \sum_{i=1}^{m} N[i, j] > 0$$

if some set of subtests prove module j is operative, and if $$\operatorname{Sum} TN[j] = \sum_{i=1}^{m} N[i, j] * T[i] < 1$$

then all subtests in a set pass and item j is operative, wherein if item j is operative, s[j]=0, and if $$\text{Sum} TN[j] = \sum_{i=1}^{m} N[i, j] * T[i] \geq 1$$

then at least one subtest in a set has failed.

27. A method according to claim 23, wherein N[i,j]=1/P if failure of fewer than P subtests i proves item j is operative, and 0 otherwise, and $$\text{Sum } N[j] = \sum_{i=1}^{m} N[i, j] > 0$$

if success of some subtests can prove item j is operative, and if $$\text{Sum} TN[j] = \sum_{i=1}^{m} N[i, j] * T[i] < 1$$

fewer than P subtests failed and item is operative and set S[j]=0, and if $$\text{Sum} TN[j] = \sum_{i=1}^{m} N[i, j] * T[i] = P/P \geq 1$$

then P or more subtests have failed, wherein the item is considered suspect.

28. A method according to claim 23, and further comprising the step of processing subtest results T[i] and matrix values Y[i,j] by multiplying then summing, or logically ANDing then summing.

29. A method according to claim 23, and further comprising the step of finding the largest value of a probability factor FP[j] when there are two or more values S[j] that have substantially the same largest value to determine which item has the most likely failure.

30. A method according to claim 23, wherein the probability factor FP[] comprises a n vector of estimated item failure rates for respective items.

31. A method according to claim 23, wherein the probability factor FP[] comprises a n vector for the ease of replacement of respective items.

32. A method according to claim 23, and further comprising the step of deriving the variables SumTN[] from subtest results T[] and a predetermined m×n matrix N[], where N[i,j]=1 if test i along with others proves that item j is operative.

33. A method according to claim 23, and further comprising the step of deriving the variables SumTN[] from subtest results T[] and a predetermined m×n matrix N[], where N[i,j]=1/P if subtest i is in a set of subtests where failure of fewer than P subsets roves that item j is operative.

34. A method of automatically isolating item faults comprising the step of:
- obtaining fault symptoms or subtest results T[] for a plurality of n items where T[] comprises a vector of m subtest results and T[i]=the degree to which subtest i fails or passes, with T[i]>0 for failure and T[i]≦0 for success;
- obtaining subtest status Trun[] for a plurality of n items where Trun[] comprises a vector of m status values and Trun[i]=1 if the result of subtest i is known, and Trun[i]=0 if the result of subtest i is unknown;
- first correlating or comparing the subtest results T[] with matrix values Y[], where Y[] comprises a predetermined m×n matrix where Y[i,j]>0 if failure of item j can cause subtest i to fail and Y[i,j]≦0 if failure of item j does not cause subtest i to fail;
- obtaining from the first correlation or comparison a value Sraw[j] for each item that reflects the number of subtest failures that are explained by a failure of item j, or the degree of similarity of T[] to the maximum failure pattern expected from a failure of item j, wherein any item j is suspect if Sraw[j]>0;
- for each i, setting a value Tmod[i]=a positive value if Trun[i]=0, and Tmod[i]=T[i] if Trun[i]=1, where Tmod[] comprises a vector of m subtest results and Tmod[i]=the degree to which subtest i fails or passes, with Tmod[i]>0 for failure and Tmod[i]≦0 for success.
- setting each value SumN[j]=a positive value if column or row j of matrix N corresponding to item j has any nonzero entries, and SumN[j]=0 if column or row j of matrix N has no nonzero entries, where SumN[j]=a positive value if SumTN can be used to prove that item J is ok, and SumN[j]=0 if SumTN cannot be used to prove that item j is ok;
- second correlating or comparing matrix values N[i,j] with the subtest results Tmod[i], where N[] comprises a predetermined m×n matrix where N[i,j]>0 if failure of item j causes subtest i to fail and N[i,j]=0 if failure of item j does not cause subtest i to fail;
- obtaining from the second correlation or comparison a value SumTN[j] for each item that reflects a weighted number of subtest failures that are explained by a failure of item j, or the degree of similarity of T[] to the minimum failure pattern expected from a failure of item j, wherein any item j is not suspect if SumN[j]>0 and SumTN[j]<a positive threshold;
- setting each value S[j]=0 if SumN[j]>0 and SumTN[j]<a positive threshold, or otherwise S[j]=Sraw[j], where S[j] for each item j reflects the number of subtest failures that are explained by a failure of item j, or the degree of similarity of T[] to the maximum failure pattern expected from a failure of item j, wherein any item j is suspect if S[j] is >0;
- obtaining a predetermined probability factor FP[j] for each item j, where FP reflects relative item failure rates, or ease of item repair or replacement, or other criteria for breaking ties in values of S[] and replacing which item first;
- determining which item x has the most likely primary failure by determining the largest value of S[j] when S[j] has multiple nonzero entries, and breaking ties based on the largest value of FP[], such that the largest value of S[j], or S[j] and FP[j] for ties, is indicative of the most likely single primary item failure where any other items with S[j] above a threshold represent alternate possible secondary item failures; and
- obtaining from Y[] the column or row Yx[] corresponding to item x, and setting T[i]=0 for all i where Yx[i]>0, and repeating all steps up to this point until all entries of T[]=0, where more than one item may be identified as a primary failure.

* * * * *